(12) United States Patent
Von Der Lippe et al.

(10) Patent No.: US 8,947,196 B2
(45) Date of Patent: Feb. 3, 2015

(54) SYSTEM AND METHOD FOR THE AUTHENTICATION OF COMPONENTS WITHIN A SELF-SERVICE MACHINE

(75) Inventors: Carsten Von Der Lippe, Paderborn (DE); Daniela Sandschneider, Paderborn (DE); Klaus-Detlef Nolzen, Langen (DE)

(73) Assignee: Wincor Nixdorf International GmbH (DE)

( * ) Notice: Subject to any disclaimer, the term of this patent is extended or adjusted under 35 U.S.C. 154(b) by 685 days.

(21) Appl. No.: 13/259,088

(22) PCT Filed: Mar. 18, 2010

(86) PCT No.: PCT/EP2010/053509
§ 371 (c)(1),
(2), (4) Date: Dec. 7, 2011

(87) PCT Pub. No.: WO2010/112343
PCT Pub. Date: Oct. 7, 2010

(65) Prior Publication Data
US 2012/0086545 A1 Apr. 12, 2012

(30) Foreign Application Priority Data
Apr. 2, 2009 (DE) .......................... 10 2009 015 628

(51) Int. Cl.
*G05B 19/00* (2006.01)
*G06F 21/57* (2013.01)
(Continued)

(52) U.S. Cl.
CPC *G06F 21/57* (2013.01); *G06F 9/52* (2013.01); *G07F 19/20* (2013.01); *G07F 19/206* (2013.01); *G06F 2221/2129* (2013.01)
USPC ............................................ 340/5.1; 726/17

(58) Field of Classification Search
None
See application file for complete search history.

(56) References Cited

U.S. PATENT DOCUMENTS

| 5,297,283 | A | 3/1994 | Kelly, Jr. et al. |
| 7,290,072 | B2 * | 10/2007 | Quraishi et al. ............... 710/105 |
| 2005/0251589 | A1 | 11/2005 | Wang |

(Continued)

FOREIGN PATENT DOCUMENTS

| GB | 2388235 A | 11/2003 |
| KR | 20070084931 A | 8/2007 |
| WO | WO-2008061028 A1 | 5/2008 |

OTHER PUBLICATIONS

Translation of International Preliminary Report on Patentability for PCT/EP2010/053509 (Nov. 10, 2011).

*Primary Examiner* — Brian Zimmerman
*Assistant Examiner* — Sara Samson
(74) *Attorney, Agent, or Firm* — Harness, Dickey & Pierce, P.L.C.

(57) ABSTRACT

The invention relates to a method for evaluating the authenticity of peripheral devices of a self-service machine having an operating system that provides at least one global mutex, having software layers, that are arranged on the operating system, having processes that run on the self-service machine and that access the operating system and/or the software layers, comprising the steps of:
evaluating of authenticity of a connected peripheral device by a first process;
if it was determined during the evaluation that the peripheral device could not be authenticated, setting of the mutex;
evaluating the mutex by a second process based on an event and, if the mutex is set, switching the self-service machine to an error state.

12 Claims, 1 Drawing Sheet

(51) Int. Cl.
*G06F 9/52* (2006.01)
*G07F 19/00* (2006.01)

(56) References Cited

U.S. PATENT DOCUMENTS

2006/0247050 A1* 11/2006 Mathis ............................ 463/39
2008/0005586 A1    1/2008 Munguia
2008/0238612 A1* 10/2008 Carpenter .................... 340/5.74

* cited by examiner

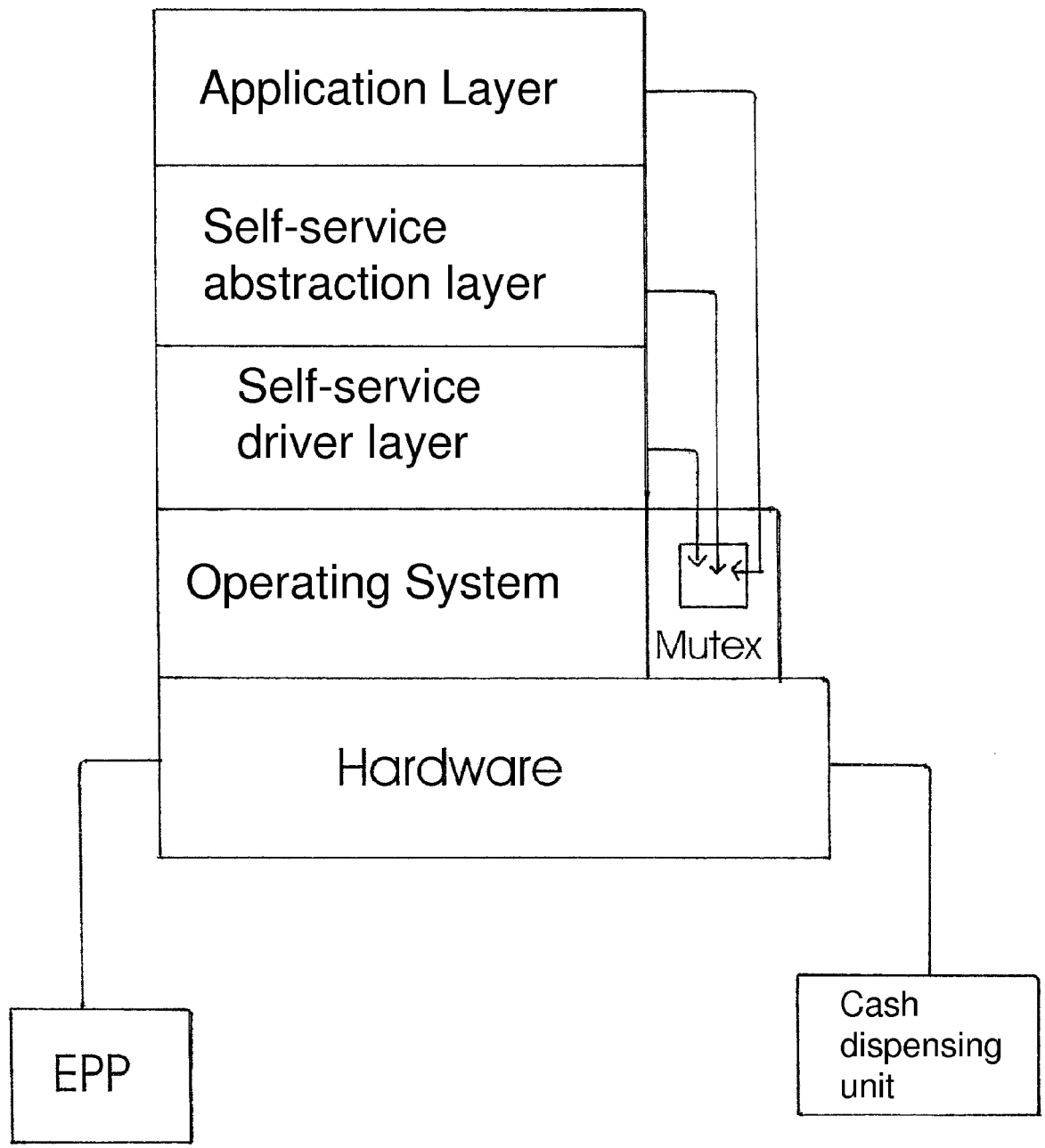

SYSTEM AND METHOD FOR THE AUTHENTICATION OF COMPONENTS WITHIN A SELF-SERVICE MACHINE

CROSS-REFERENCE TO RELATED APPLICATIONS

This application is a U.S. National Stage of International Application No. PCT/EP2010/053509, filed Mar. 18, 2010 and published in German as WO 2010/112343 A1 on Oct. 7, 2010. This application claims the benefit and priority of German Application No. 10 2009 015 628.3, filed Apr. 2, 2009. The entire disclosures of the above applications are incorporated herein by reference.

BACKGROUND

This section provides background information related to the present disclosure which is not necessarily prior art.

1. Technical Field

The invention relates to a method and a corresponding self-service machine for the authentication of components within said machine, taking into account existing hardware and software layers.

2. Discussion

Self-service machines, such as automated teller machines (ATMs), are often built up today from standard components, such as PCs with operating systems, such as the WINDOWS® or LINUX® operating systems. Additional layers are arranged on the operating system layer that take account of the special nature of the self-service machine. In the case of an automated teller machine, for example, a CSW layer (self-service driver layer) is arranged above the operating system that provides the drivers for the peripheral devices. Above this level there is an abstraction level (ZENT/XFS) (self-service abstraction level) that maps the different hardware that was installed over the years to a common functionality that can be addressed, for example, over a standard program interface (API). An application layer is arranged on this last layer that implements applications on the self-service device.

These layers must not be interfered with because the dependencies are complex and security can be compromised. Furthermore, changing these layers may be a violation of legal stipulations.

In order to ensure a high degree of security in self-service machines of this type, only specific components approved by the manufacturer may be installed. For example, installation of non-original keypads (EPPs encrypting pin pads) from outside manufacturers is not permitted. Consequently, a mechanism is needed to ensure that replacement of the keypad (or other components) is detected and that there is an appropriate reaction. Care must be taken that devices such as the keypad, cash dispensing unit, monitor, and card reader are connected to the host computer through serial interfaces such as V24 or USB, etc.

SUMMARY OF THE INVENTION

An object of the present invention is to provide a method and a device to detect the replacement of peripheral devices in self-service machines and to initiate a reaction in the event said peripheral devices are not authorized.

In one possible embodiment, a mechanism is implemented that limits the function of a system if, for example, a non-original EPP (keypad) is installed. It must be pointed out that the mention of the keypad is not to be regarded in a restrictive sense but only represents a possible example of a peripheral device.

In a process that is arranged on one of the levels described (preferably in the abstraction layer) a suitable methodology is installed for this purpose that determines whether a non-original EPP is installed. If this is the case, that is to say a non-original EPP is installed, a global flag is then set. This flag is preferably a global mutex or semaphore that is made available by the operating system.

Mutex is actually used to synchronize access to critical resources through several processes. This is achieved by mutual exclusion, or mutex. Mutex prevents secondary processes, or threads, from changing shared data structures simultaneously or quasi-parallel in an uncoordinated manner, as the result of which the data structures can go into an inconsistent state, even if the actions of each individual process/thread remain consistent when considered in isolation.

Mutex is set each time (read/write) when a process is in the critical area and accesses a resource.

In the present invention, however, mutex itself is interrogated and not necessarily the critical resource that mutex is supposed to protect. If the process that is responsible for checking the peripheral devices detects that the peripheral device cannot authenticate itself correctly, mutex is set. It is not possible to reset mutex as long as the process that set mutex does not do so itself. Consequently, mutex cannot be reset by another process so that a counterfeit keypad may be installed. If the process that is holding mutex should be canceled by outside intervention (also known as killing a process), the operating system would as a rule enable mutex. In this instance it would be theoretically possible to install a counterfeit keypad and reset mutex. However, the self-service machine constantly checks the process that is responsible for setting mutex and, in the event mutex is canceled, for example by outside intervention, the result would be a restart of the self-service machine. The system ends up in an endless boot loop if the process that set mutex is terminated, or "killed", time and time again. This ensures that outside intervention is not possible, which in turn ensures that a hardware replacement does not take place. If an additional process should attempt to access mutex in the case of a counterfeit keypad, it will discover that mutex is set and can then take appropriate emergency actions. For example, if it were a matter of a cash disbursement from a cash dispenser, the driver, or the software layer that assumes this operation, can interrogate mutex and if mutex is set, the payment is canceled and the machine goes into a separate status and reports said status to the administrative office to which the self-service machine is connected.

When the counterfeit keypad is replaced with a correct keypad, the system is restarted and mutex is not set so that the self-service machine is in a proper operating state.

By using a global mutex that is arranged in the operating system layer, it is possible that only small changes need to be made in order to determine in all layers whether a non-permissible peripheral device is present. In the preferred embodiment a process should be selected that holds the mutex that is implemented on a plurality of platforms for self-service machines so that only minor changes are necessary for each platform, or rather the change with respect to one platform can be transferred to other platforms. Reaction to the mutex that was set can be different from case to case. However, because of the global mutex it is possible that each layer as described above has access to mutex and can react accordingly. In an operating system such as a WINDOWS® operating system for example, mutex can be reached by way of the registry or paths. Appropriate names can be defined that stand for specific peripheral devices.

Consequently the interface between sensors and actuators is a mutex object. A non-original EPP was detected with an object set.

The name of the object is "Global\xxxEppyy" (e.g. in an operating system such as the WINDOWS® 2000 operating system or the WINDOWS® XP operating system). In an operating system such as the WINDOWS®s NT 4.0 operating system, the "Global\" prefix is dropped because it is not supported there.

Before each disbursement the software checks whether this flag/mutex exists and whether it is allocated. The disbursement will go through only if the flag does not exist, or exists and is not allocated. The interrogating software must, in the case of some other error at open/create of the mutex object, prevent the payment (or rather all transfer requests that can bring money for disbursement) since it may be that a process is blocked from access to the object.

If the appropriate transfer requests are prevented, a new error code is returned.

The mechanism described above is implemented by polling the mutex object in a just a few DLLs (dynamic loadable library).

The actual evaluation of the authenticity of the peripheral devices is not an integral part of the invention. Normally this is done by checking signatures that are downloaded from the peripheral devices. There already exists a plurality of inventions and applications in this area. The present invention is aimed principally at controlling the reaction of the self-service system if it is determined, preferably when starting up or booting the self-service system, that a peripheral device such as the keypad has been replaced.

BRIEF DESCRIPTION OF THE DRAWINGS

The drawing described herein is for illustrative purposes only of selected embodiments and not all possible implementations, and is not intended to limit the scope of the present disclosure.

The single FIGURE shows the layer structure of a self-service machine with peripheral devices.

DETAILED DESCRIPTION OF THE PREFERRED EMBODIMENTS

Example embodiments will now be described more fully with reference to the accompanying drawing.

The single FIGURE shows the layer structure of the present invention that represents a self-service machine. A computer/PC that is connected over interfaces to peripheral devices acts as the basis of the self-service machine. These interfaces are often USB or V.24 interfaces that are connected to the PC. An operating system, which in the preferred embodiment is a WINDOWS® operating system, a UNIX® operating system, or a LINUX® operating system, runs on the computer/PC. This operating system provides a global mutex in a memory area. A self-service driver layer is arranged above the operating system that enables access to the cash-dispensing unit and the EPP keyboard. For security reasons the drivers for the operating system are not normally used, but rather separate, secure drivers from the self-service machine manufacturer. A self-service abstraction layer is arranged above the driver layer which abstracts the driver layer so that the applications that are arranged in the application layer do not have to be adapted when the hardware changes. The abstraction layer thus represents a mediating layer between application layer and driver layer. Processes run in said abstraction layer, or APIs or DLLs are prepared that are made available to the application. As can be seen from the arrows in the FIGURE, all layers have access to mutex that is arranged in the operating system layer. As a result, no great changes are required within the individual layers, but only a few changes in the abstraction layer or the driver layer are necessary to attain the desired result.

What is claimed is:

1. A method for evaluating the authenticity of peripheral devices of a self-service machine having an operating system that provides a global mutex, with software levels that are arranged on the operating system, with processes that run on the self-service machine and that access the operating system and/or the software layers, comprising the steps of:

Evaluating the authenticity of a connected peripheral device through a first process;

If it was determined during the evaluation that the peripheral device could not be authenticated, setting the mutex;

Evaluating the mutex by a second process based on an event and, if the mutex is set, switching the self-service machine to an error state, wherein the mutex cannot be reset other than by the first process that set the mutex.

2. The method according to claim 1, wherein the self-service machine is an automated teller machine that is equipped with a keypad that is checked for authenticity by the first process.

3. The method according to claim 1, wherein the second process activates a cash dispensing unit, but a cash disbursement does not occur if the mutex is set.

4. The method according to claim 1, wherein the mutex is determined over a path or a registry of the operating system.

5. The method according to claim 1, wherein the first process evaluates the peripheral device at system startup.

6. The method according to claim 1, wherein a third process monitors the first process in order to ensure that said first process is not stopped and in the event that it is stopped, the self-service machine is shut down.

7. A self-service machine that evaluates the authenticity of peripheral devices of a self-service machine that has an operating system that provides a global mutex, having software layers that are arranged on the operating system, having processes that run on the self-service machine and that access the operating system and/or the software levels, wherein the self-service machine runs:

a first process that performs an evaluation of the authenticity of a connected peripheral device and, if it was determined during the evaluation that the peripheral device could not be authenticated, sets the mutex;

a second process that evaluates the mutex based on an event and, if the mutex is set, switches the self-service machine to an error state;

wherein the mutex cannot be reset other than by the first process that set the mutex.

8. The self-service machine according to claim 7, wherein the self-service machine is an automated teller machine equipped with a keypad that is checked for authenticity by the first process.

9. The self-service machine according to claim 7, wherein the second process activates a cash dispensing unit, where cash disbursement does not take place if the mutex is set.

10. The self-service machine according to claim 7, wherein the mutex is determined over a path or a registry of the operating system.

11. The self-service machine according to claim 7, wherein the first process evaluates the peripheral device at system startup.

12. The self-service machine according to claim 7, further comprising a third process that monitors the first process to ensure that said first process is not ended and, if it is ended, the self-service machine is shut down.

* * * * *